(12) United States Patent
Kato

(10) Patent No.: US 8,570,419 B2
(45) Date of Patent: Oct. 29, 2013

(54) SOLID-STATE IMAGING DEVICE, DRIVING METHOD THEREOF, AND CAMERA

(75) Inventor: Yoshiaki Kato, Shiga (JP)

(73) Assignee: Panasonic Corporation, Osaka (JP)

( * ) Notice: Subject to any disclaimer, the term of this patent is extended or adjusted under 35 U.S.C. 154(b) by 633 days.

(21) Appl. No.: 12/887,923

(22) Filed: Sep. 22, 2010

(65) Prior Publication Data

US 2011/0075002 A1 Mar. 31, 2011

(30) Foreign Application Priority Data

Sep. 30, 2009 (JP) .................................. 2009-228452

(51) Int. Cl.
*H04N 5/335* (2011.01)

(52) U.S. Cl.
USPC ........................................................ 348/311

(58) Field of Classification Search
USPC ........................................................ 348/311
See application file for complete search history.

(56) References Cited

U.S. PATENT DOCUMENTS

| 5,867,212 A | 2/1999 | Toma et al. |
| 6,995,795 B1 | 2/2006 | Losee et al. |
| 7,616,246 B2 | 11/2009 | Hirota |
| 2006/0092304 A1 | 5/2006 | Hirota |
| 2007/0263110 A1 | 11/2007 | Itsumi et al. |
| 2009/0316035 A1* | 12/2009 | Hirota ........................... 348/311 |

FOREIGN PATENT DOCUMENTS

| JP | 2006-129137 | 5/2006 |
| JP | 2007-295365 | 11/2007 |

* cited by examiner

*Primary Examiner* — Roberto Velez
*Assistant Examiner* — Stephen Coleman
(74) *Attorney, Agent, or Firm* — McDermott Will & Emery LLP

(57) ABSTRACT

A solid-state imaging device includes vertical transfer units each including first and second transfer units. A drive control unit controls transfer processes of the vertical transfer units so that (i) after transferring a packet, the first transfer unit stops transferring another packet in a period during which the packet is horizontally transferred, (ii) the second transfer unit in the same group transfers the packet to a horizontal transfer unit at a timing different from a timing at which another second transfer unit in the same group transfers a different packet to the horizontal transfer unit, (iii) the horizontal transfer unit horizontally transfers the received packet in a horizontal transfer period different from another horizontal transfer period during which the different packet is horizontally transferred, and (iv) at least one charge transfer stage serving as the well region differs between these horizontal transfer periods.

11 Claims, 11 Drawing Sheets

SOLID-STATE IMAGING DEVICE, DRIVING METHOD THEREOF, AND CAMERA

BACKGROUND OF THE INVENTION (1) Field of the Invention

The present invention relates to a Charge-Coupled Device (CCD) solid-state imaging device reading out signal charges accumulated in a plurality of photoelectric conversion units in a matrix array (in rows and columns) in order to obtain signals of a two-dimensional image. More particularly, the present invention relates to a technology of transferring the signal charges.

(2) Description of the Related Art

A typical example of solid-state imaging devices is a CCD solid-state imaging device that has been widely used. The CCD solid-state imaging device is used in an imaging unit in camcorders, digital cameras, and the like, or in an image recognition unit in facsimiles, image scanners, and the like. Such a CCD solid-state imaging device has a CCD image sensor (CCD solid-state imaging element) as an imaging element.

Examples of the technologies related to the conventional CCD solid-state imaging devices are disclosed in Japanese Unexamined Patent Application Publications Nos. 2007-295365 and 2006-129137 (hereinafter, referred to as Patent Reference 1 and Patent Reference 2, respectively).

SUMMARY OF THE INVENTION

Referring to a schematic diagram of FIG. 9, a planar structure of the conventional CCD solid-state imaging device is explained.

Photodiodes 101 serving as photoelectric conversion units are arrayed in a matrix. A vertical transfer unit (VCCD) 102 is provided for each column of the photodiodes 101. Such vertical transfer units 102 and the photodiodes 101 form an imaging region 103. Signal charges accumulated in each photodiode 101 are read out to a corresponding one of the vertical transfer units 102 which vertically transfer such signal charges in parallel to a horizontal transfer unit 104. Thereby, the horizontal transfer unit 104 sequentially receives signal charges representing each scan line from the vertical transfer units 102. The horizontal transfer unit 104 then horizontally transfers the signal charges to a charge detection unit 105. The charge detection unit 105 converts the signal charges into signal voltages. An output amplifier 106 amplifies the signal voltages to be outputted as an imaging output OUT. The above-described elements are formed on an n-type substrate 107.

The vertical transfer units 102 are driven to perform the transfer by, for example, 6-phase transfer clocks $\phi V1$, $\phi V2$, $\phi V3$, $\phi V4$, $\phi V5$, and $\phi V6$ applied from a timing generation circuit 108. Thereby, signal charges read out to the vertical transfer units 102 are transferred in a vertical direction. Here, signal charges representing one scan line are transferred in each horizontal blanking period.

The horizontal transfer unit 104 is driven to perform the transfer by, for example, two-phase horizontal transfer clocks $\phi H1$ and $\phi H2$. Thereby, signal charges representing one scan line are horizontally transferred in each horizontal scan period after a corresponding horizontal blanking period.

In the meanwhile, in the solid-state imaging device of FIG. 9, the 6-phase transfer clocks $\phi V1$ to $\phi V6$ are applied to transfer electrodes V1, V2, V3, V4, V5, and V6 of the vertical transfer units 102 to transfer signal charges of packets 31, as shown in potential distribution of the vertical transfer units 102 in FIG. 10. A packet 31 refers to signal charges transferred by to a contiguous well region that is separated from other well regions by barrier regions. In each horizontal scan period, the vertical transfer units 102 stop transfer of packets 31 and keep the situation, for example, where a packet 31 is accumulated under the transfer electrodes V1 and V2. Therefore, if, for example, there is a defect of a dark current source under the transfer electrode V1, dark current is added to the packet 31 in proportional to the horizontal scan period.

In order to address the above drawback, Patent Reference 1 discloses a solid-state imaging device in which the number of transfer electrodes holding packets of vertical transfer units is changed alternately in each horizontal transfer period.

However, if the number of transfer electrodes holding packets of vertical transfer units is changed for each horizontal transfer period during which signal charges in one row are horizontally transferred in the same manner as employed in the conventional solid-state imaging device of Patent Reference 1, there is a problem that vertical line noises resulting from dark current generated in vertical transfer units have a strength varying in each row. As a result, troubles occur in image quality.

In other words, in the solid-state imaging device of Patent Reference 1, each of the vertical transfer units has a plurality of repeated sets each including the 6-phase driving vertical transfer electrodes V1, V2, V3, V4, V5, and V6, as shown in potential distribution of the vertical transfer units in FIG. 11. Here, the number of transfer electrodes holding packets 31 of vertical transfer units is changed between a horizontal transfer period during which signal charges in an even row are transferred and a horizontal transfer period during which signal charges in an odd row are transferred. For instance, a packet 31 is held under three electrodes V1 to V3 in a horizontal transfer period for an Nth, (N+2)th, . . . , row, while a packet 31 is held under two electrodes V2 and V3 in a horizontal transfer period for an (N+1)th, (N+3)th, . . . , row. Therefore, if, for example, a dark current source exists under the transfer electrode V1, the following happens. In a horizontal transfer period during which signal charges in an Nth row are transferred, dark current generated under the transfer electrode V1 is added as noise to a packet 31. On the other hand, in a horizontal transfer period during which signal charges in an (N+1)th row are transferred, a charge transfer stage including the transfer electrode V1 becomes a barrier state so that dark current generated in the transfer electrode V1 is not added to the packet 31. Thereby, a vertical line level of dark current noise signals differs between even rows and odd rows, which produces noises appearing as vertical dotted lines on an image. As a result, quality of the image is significantly deteriorated.

In other words, a level of dark current noise signals is different depending on whether a region under a transfer electrode having a dark current source occurring dark current locally in a vertical transfer unit is a well region or a barrier region. For example, if the dark current source exists under the transfer electrode V1, dark current is large when a well region is formed under the transfer electrode V1, while dark current is small when a barrier region is formed under the transfer electrode V1. Therefore, in the conventional solid-state imaging device of Patent Reference 1, a situation under the transfer electrode V1 differs between a horizontal transfer period during which signal charges in an even row are transferred and a horizontal transfer period during which signal charges in an odd row are transferred. Therefore, a level of dark current noise signals differs between signals of an even row and signals of an odd row. As a result, a strength of a vertical line level of VCCD dark current is varied.

Here, the problem of the VCCD dark current vertical line noises can be solved by detecting a level of dark current noise signals of a vertical dummy unit and then correcting the detected level. However, when strengths of the vertical line level are various, the vertical line noises appear as dotted lines. Therefore, in order to correct the defects of the line noises, the correction cannot be performed homogeneously but should be very complicated. If not, the vertical line noises resulting from dark current are left in the image. It is also possible that, in the vertical dummy unit, a level of dark current noise signals is detected separately for signals of an even row and for signals of an odd row. Therefore, the correction of vertical line noises is performed separately for even rows and for odd rows. However, this increases a cost due to memory capacity increase and complicated signal processing.

Therefore, in order to address the above problems, an object of the present invention is to provide a solid-state imaging device, a driving method of driving the solid-state imaging device, and a camera including the solid-state imaging device, each of which can reduce influence of noises resulting from dark current occurred in vertical transfer units.

In accordance with an aspect of the present invention for achieving the object, there is provided a solid-state imaging device including: photoelectric conversion units arrayed in rows and columns; vertical transfer units configured to read signal charges from the photoelectric conversion units and vertically transfer the signal charges; a horizontal transfer unit configured to horizontally transfer the signal charges received from the vertical transfer units; and a drive control unit configured to control the transfer of the vertical transfer units and the transfer of the horizontal transfer unit, wherein the vertical transfer units are allocated to at least one group including a plurality of vertical transfer units in the vertical transfer units, the at least one group is arranged in a horizontal direction, each of the plurality of vertical transfer units in a same group in the at least one group includes a first transfer unit and a second transfer unit, the first transfer unit receiving a driving voltage shared in the same group to vertically transfer signal charges, and the second transfer unit being provided for the first transfer unit to receive a driving voltage independent in the same group to transfer the signal charges from the first transfer unit to the horizontal transfer unit, the first transfer unit includes four or more charge transfer stages each of which is provided for a corresponding transfer electrode and serves as a barrier region or a well region depending on a driving voltage applied to the corresponding transfer electrode, the well region being separated from another well region by the barrier region and forming a packet that is signal charges to be transferred by the well region, and the drive control unit is configured to control the transfer of the vertical transfer units so that (i) after the first transfer unit in each of the plurality of vertical transfer units in the same group transfers a packet, the first transfer unit stops transfer of another packet in a time period during which the packet is horizontally transferred, (ii) the second transfer unit in each of the plurality of vertical transfer units in the same group transfers the packet to the horizontal transfer unit at a different timing different from a timing at which another second transfer unit in the same group transfers a different packet to the horizontal transfer unit, (iii) the horizontal transfer unit horizontally transfers the packet received at the different timing, in a horizontal transfer period different from another horizontal transfer period during which the different packet is horizontally transferred, and (iv) at least one charge transfer stage serving as the well region among the four or more charge transfer stages differs between the horizontal transfer period and the another horizontal transfer period. It is also possible that the drive control unit is configured to control the transfer of the vertical transfer units so that the number of charge transfer stages in a set serving as the well region among the four or more charge transfer stages differs between the horizontal transfer period and the another horizontal transfer period. It is further possible that the drive control unit is configured to control the transfer of the vertical transfer units so that second transfer units including the second transfer unit transfer respective packets which are included in the same group in all of the plurality of vertical transfer units to the horizontal transfer unit at respective different timings.

With the above structure, it is possible to separate signal charges accumulated in photoelectric conversion units in the same row but in different columns during the same period, into a plurality of portions to be separately transferred to the horizontal transfer unit a plurality of times, and then to be separately transferred by the horizontal transfer unit in a plurality of different time periods. Thereby, a position of a packet in a vertical transfer unit that stops transfer is shifted for each of the different time periods. Therefore, in a time period during which signal charges in one row are horizontally transferred, packets do not remain in the same charge transfer stage for a long time. This shortens a time period during which a packet remains in a charge transfer stage having a dark current source. As a result, it is possible to provide the solid-state imaging device capable of reducing influence of dark current noises occurred in the vertical transfer units. The provided solid-state imaging device can reduce dark current signals occurred in processing minute signal charges in order to improve transfer efficiency, thereby improving image quality while keeping a high gain state with a high photographic sensitivity under International Organization for Standardization (ISO).

Here, since a position of a packet in a vertical transfer unit is shifted for each horizontal transfer of signals charges in the same row, a level of dark current noise signals is not varied depending on an even row or an odd row as seen in the solid-state imaging device of Patent Reference 1. As a result, a strength of a vertical line level of VCCD dark current is not varied.

It is further possible that the drive control unit is configured to control the transfer of the vertical transfer units so that the first transfer unit transfers the packet in the first transfer unit towards the second transfer unit in an interval between the horizontal transfer period and the another horizontal transfer period.

With the above structure, a packet in the first transfer unit which is to be horizontally transferred next is shifted downstream in a vertical transfer direction prior to horizontal transfer of signal charges in a next row. This can shorten a transfer time period during which a packet is transferred from the first transfer unit to the second transfer unit. As a result, signals can be outputted at a high speed, and influence of dark current noises can be further reduced.

In accordance with another aspect of the present invention, there is provided a driving method of driving a solid-state imaging device including: photoelectric conversion units arrayed in rows and columns; vertical transfer units configured to read signal charges from the photoelectric conversion units and vertically transfer the signal charges; and a horizontal transfer unit configured to horizontally transfer the signal charges received from the vertical transfer units, wherein the vertical transfer units are allocated to at least one group including a plurality of vertical transfer units in the vertical transfer units, the at least one group is arranged in a horizontal direction, each of the plurality of vertical transfer units in a same group in the at least one group includes a first transfer unit and a second transfer unit, the first transfer unit receiving a driving voltage shared in the same group to vertically transfer signal charges, and the second transfer unit being provided for the first transfer unit to receive a driving voltage independent in the same group to transfer the signal charges from the first transfer unit to the horizontal transfer unit, and the first transfer unit includes four or more charge transfer stages each of which is provided for a corresponding transfer electrode and serves as a barrier region or a well region depending on a driving voltage applied to the corresponding transfer electrode, the well region being separated from another well region by the barrier region and forming a packet that is signal charges to be transferred by the well region, the driving method including controlling the transfer of the vertical transfer units so that (i) after the first transfer unit in each of the plurality of vertical transfer units in the same group transfers a packet, the first transfer unit stops transfer of another packet in a time period during which the packet is horizontally transferred, (ii) the second transfer unit in each of the plurality of vertical transfer units in the same group transfers the packet to the horizontal transfer unit at a different timing different from a timing at which another second transfer unit in the same group transfers a different packet to the horizontal transfer unit, (iii) the horizontal transfer unit horizontally transfers the packet received at the different timing, in a horizontal transfer period different from another horizontal transfer period during which the different packet is horizontally transferred, and (iv) at least one charge transfer stage serving as the well region among the four or more charge transfer stages differs between the horizontal transfer period and the another horizontal transfer period.

Thereby, it is possible to implement the driving method of driving a solid-state imaging device to reduce influence of dark current noises occurred in the vertical transfer units.

In accordance with still another aspect of the present invention, there is provided a camera including the above-described solid-state imaging device.

With the structure, it is possible to implement the camera capable of reducing influence of dark current noises occurred in the vertical transfer units.

According to the present invention, it is possible to reduce influence of dark current noises occurred in vertical transfer units, thereby reducing a maximum level of signals of the dark current noises. It is also possible to suppress that a strength level of vertical line noise resulting from VCCD dark current varies depending on each row. In recent years especially, further miniaturization of pixels increases a concentration of impurity in VCCD. As a result, dark current is more likely to occur. Even in the circumstances, the present invention can suppress noises resulting from dark current to provide a solid-state imaging device with more pixels and high image quality.

FURTHER INFORMATION ABOUT TECHNICAL BACKGROUND TO THIS APPLICATION

The disclosure of Japanese Patent Application No. 2009-228452 filed on Sep. 30, 2009 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings.

DESCRIPTION OF THE PREFERRED EMBODIMENT(S)

The following describes a solid-state imaging device, a driving method of driving the solid-state imaging device, and a camera including the solid-state imaging device, according to embodiments of the present invention in detail with reference to the drawings.

First Embodiment

First, the solid-state imaging device and the driving method thereof according to the first embodiment of the present invention is described.

Figure 1:
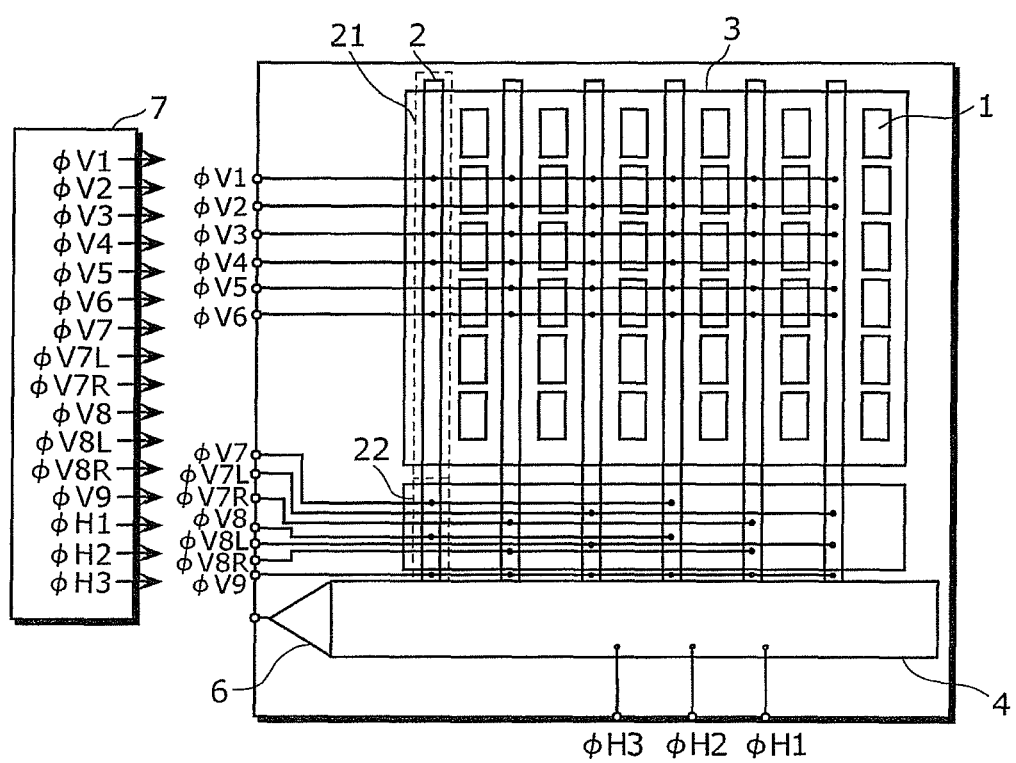
FIG. 1 is a block diagram showing a structure of a solid-state imaging device according to a first embodiment of the present invention.

FIG. 1 is a block diagram showing a structure of the solid-state imaging device according to the first embodiment of the present invention.

The solid-state imaging device includes an imaging unit 3, a horizontal transfer unit 4, an output unit 6, and a drive control unit 7. The imaging unit 3 includes a plurality of photodiodes 1 and a plurality of vertical transfer units 2.

The photodiodes 1, each of which is an example of the photoelectric conversion unit according to the aspect of the present invention, are arrayed in rows and columns in the imaging unit 3.

Each of the vertical transfer units 2 is arranged for a corresponding one of the columns of the photodiodes 1. Each vertical transfer unit 2 reads out signal charges accumulated in a corresponding photodiode 1, and then transfers the signal charges in a vertical direction. The vertical transfer units 2 are allocated into a plurality of groups each having three vertical transfer units 2 (namely, or three columns). The groups (hereinafter, referred to also as a "vertical transfer group") are repeatedly arranged in a horizontal direction. Each vertical transfer unit 2 in the same vertical transfer group has a first transfer unit 21 and a second transfer unit 22. The first transfer unit 21 receives driving voltages shared in the same group (namely, the same driving voltages as those applied to the other first transfer units 21 in the same group) to transfer signal charges in a vertical direction. The second transfer unit 22, which is provided for a corresponding one of the first transfer units 21 in the same group, receives driving voltages independent in the same group (namely, driving voltages different from those applied to the other second transfer units 22 in the same group) to transfer signal charges provided from the corresponding first transfer unit 21 to the horizontal transfer unit 4.

Each of the vertical transfer units 2 includes a plurality of charge transfer stages. Each of the charge transfer stages is provided for a corresponding one of transfer electrodes in the vertical transfer unit 2. Each charge transfer stage serves as a barrier region (or a part of a barrier region) or a well region (or a part of a well region) of potentials depending on a transfer pulse (driving voltage) applied to the corresponding transfer electrode. The first transfer unit 21 includes six charge transfer stages to which different transfer pulses are applied. The second transfer unit 22 is a final charge transfer stage(s) positioned immediately prior to the horizontal transfer unit 4, from among all charge transfer stages in the vertical transfer unit 2. Each of the charge transfer stages has one electrode to which a transfer pulse is applied, and an impurity region of a semiconductor substrate which is formed under the electrode.

The horizontal transfer unit 4 horizontally transfers the signal charges transferred from the vertical transfer units 2. The horizontal transfer unit 4 includes three charge transfer stages to which different transfer pulses are applied.

The drive control unit 7 controls the vertical transfer units 2 and the horizontal transfer unit 4 to transfer electric charges. More specifically, the drive control unit 7 applies 6-phase transfer pulses φV1, φV2, φV3, φV4, φV5, and φV6 to the electrodes (vertical transfer electrodes) in the first transfer unit 21 to drive the first transfer unit 21. Then, the drive control unit 7 applies seven kinds of transfer pulses φV7, φV7R, φV7L, φV8, φV8R, φV8L, and φV9 to the electrodes (vertical final stage electrodes) in the second transfer unit 22 to drive the second transfer unit 22. In addition, the drive control unit 7 applies 3-phase horizontal transfer pulses φH1, φH2, and φH3 to electrodes (horizontal transfer electrodes) in the horizontal transfer unit 4 to drive the horizontal transfer unit 4.

The drive control unit 7 performs control transfer of the vertical transfer units 2 and the transfer of the horizontal transfer unit 4 as follows. (i) After the first transfer unit 21 in each of the vertical transfer units 2 in the same group transfers a packet which is signal charges to be transferred by a well region separated from another well region by a barrier region, the first transfer unit 21 stops transfer of another packet in a time period during which the packet is horizontally transferred. (ii) The second transfer unit 22 in each of the plurality of vertical transfer units 2 in the same group transfers the packet to the horizontal transfer unit 4 at a timing different from a timing at which another second transfer unit 22 in the same group transfers a different packet to the horizontal transfer unit 4. (iii) The horizontal transfer unit 4 horizontally transfers the packet received at the different timing, in a horizontal transfer period different from another horizontal transfer period during which the different packet is horizontally transferred. Then, (iv) at least one charge transfer stage serving as the well region differs between the horizontal transfer period and the another horizontal transfer period. Here, the drive control unit 7 controls the transfer of the vertical transfer units 2 so that the first transfer unit 21 transfers the packet in the first transfer unit 21 towards the second transfer unit 22 in an interval between the horizontal transfer period and the another horizontal transfer period.

Figure 2:
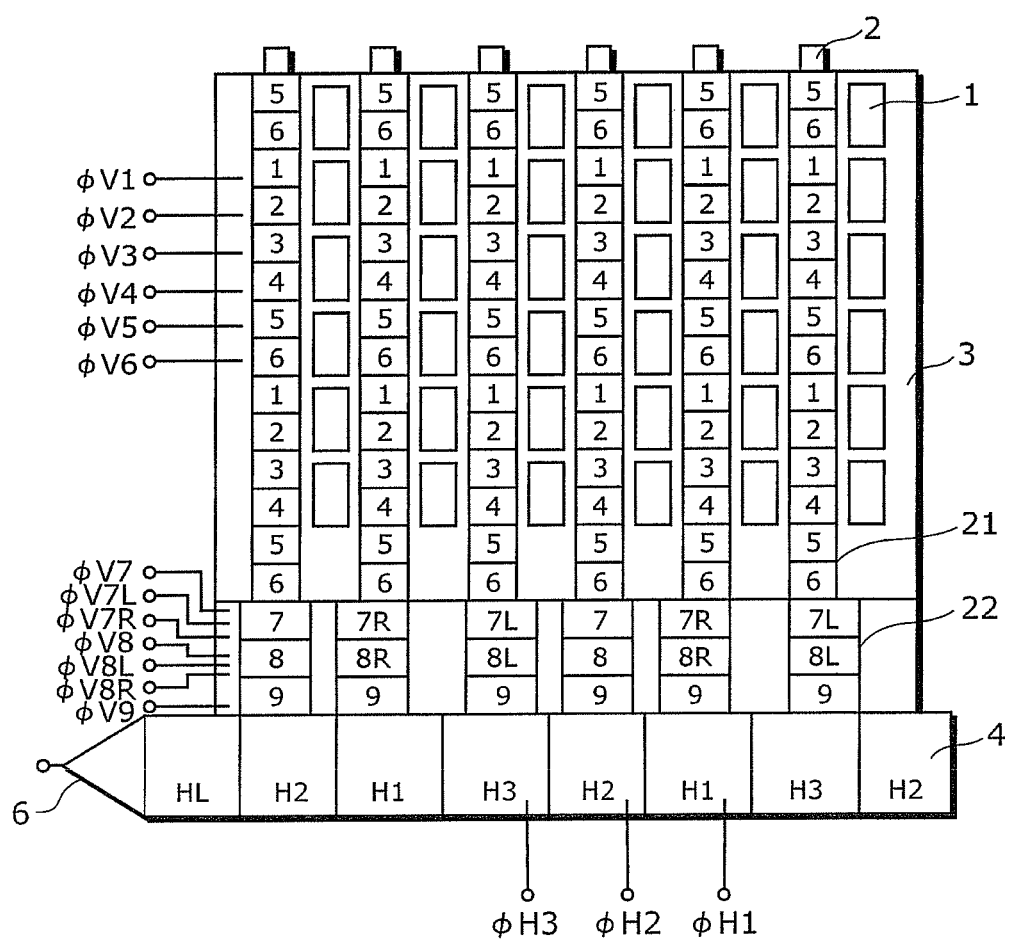
FIG. 2 is a diagram showing a structure of electrodes in the solid-state imaging device according to the first embodiment of the present invention.

FIG. 2 is a block diagram showing a structure of the electrodes of the solid-state imaging device according to the first embodiment of the present invention.

In each first transfer unit 21, two vertical transfer electrodes are formed for one photodiode 1, and sets each having six vertical transfer electrodes V1, V2, V3, V4, V5, and V 6 are repeatedly arranged. The transfer pulses φV1 to φV6 are applied to the vertical transfer electrodes V1 to V6, respectively, so as to transfer a packet towards the horizontal transfer unit 4.

Each second transfer unit 22 has the vertical final stage electrodes V7, V7R, V7L, V8, V8R, V8L, and V9. Transfer pulses φV7, φV7R, φV7L, φV8, φV8R, φV8L, and φV9 are applied to these vertical final stage electrodes V7 to V9.

The horizontal transfer unit 4 has three kinds of transfer electrodes H1, H2, and H3 to which 3-phase horizontal transfer pulses φH1 to φH3 are applied, respectively. In horizontal transfer, one packet is generated for each set of the transfer electrodes H1 to H3. This means that one packet for three vertical transfer units 2 can be transferred independently. Therefore, signal charges are read out from three kinds of columns and the same single row, and then transferred by respective second transfer units 22 separately respective three times to the horizontal transfer unit 4. The horizontal transfer unit 4 horizontally transfers the received signal charges separately respective three times to the output unit 6 that outputs the signal charges.

Figure 3:
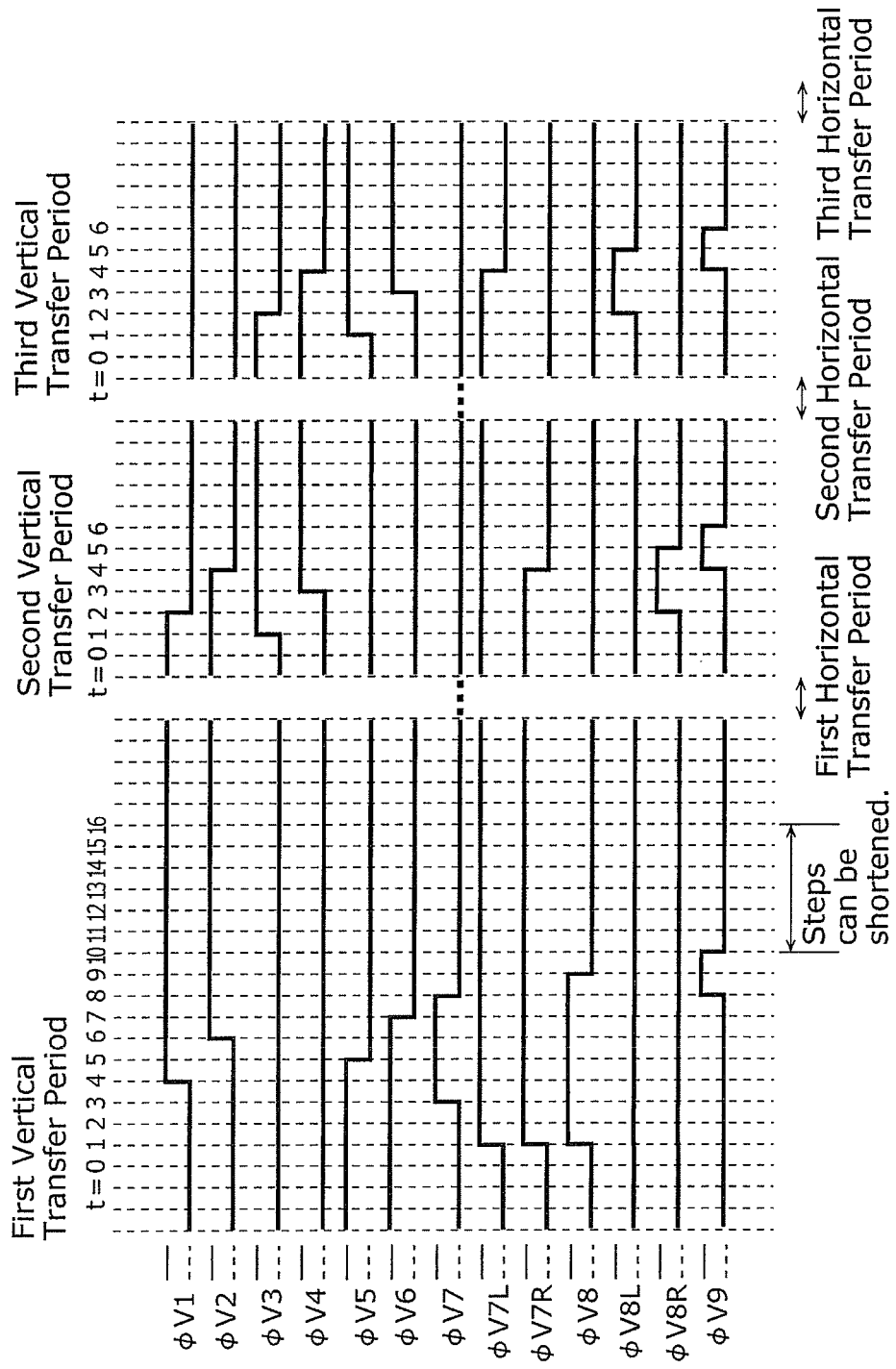
FIG. 3 is a timing diagram showing a driving method of driving the solid-state imaging device according to the first embodiment of the present invention.

FIG. 3 is a timing diagram showing a driving method of driving the solid-state imaging device according to the first embodiment of the present invention.

By the driving method in FIG. 3, a transfer period during which signal charges read out from one row are transferred (in other words, a period from when signal charges read out from a row are outputted from the solid-state imaging device until when signal charges read out from a next row are outputted from the solid-state imaging device) is divided into a first vertical transfer period, a second vertical transfer period, a third vertical transfer period, a first horizontal transfer period, a second horizontal transfer period, and a third horizontal transfer period.

In the first vertical transfer period, signal charges accumulated in the same row and in all columns in the same time period are transferred to the second transfer units 22 at the same timing, and then only signal charges in the first column in each vertical transfer group of the vertical transfer units 2 are transferred to the horizontal transfer unit 4. Then, in the second vertical transfer period, only signal charges in the second column in each vertical transfer group are transferred to the horizontal transfer unit 4. Then, in the third vertical transfer period, only signal charges in the third column in each vertical transfer group are transferred to the horizontal transfer unit 4.

In the first horizontal transfer period, only signal charges in each first column are horizontally transferred to the output unit 6. Then, in the second horizontal transfer period, only signal charges in each second column are horizontally transferred to the output unit 6. Then, in the third horizontal transfer period, only signal charges in each third column are horizontally transferred to the output unit 6.

More specifically, in the first vertical transfer period, at time t=0, voltages of transfer pulses φV5 and φV6 are switched to high. Thereby, a packet is held under the two vertical transfer electrodes V5 and V6.

Then, in a time period from t=1 to t=3, voltages of the transfer pulses φV7, φV7R, φV7L, and φV8 are switched from low to high. Thereby, a packet is held under the vertical final stage electrodes V7, V7R, V7L, and V8 in the second transfer unit 22.

Then, in a time period from t=4 to t=7, voltages of the transfer pulses φV1 and φV2 are switched from low to high, and voltages of the transfer pulses φV5 and φV6 are switched from high to low. Thereby, the packet held under the vertical transfer electrodes V5 and V6 is transferred to a location under the vertical transfer electrodes V1 and V2 in a next repeating set of electrodes of each first transfer unit 21, and a packet in the second transfer unit 22 is transferred to a location under the vertical final stage electrodes V7, V7R, and V7L. Here, a voltage of the transfer pulse φV8 is already high, so that a packet is present also under the vertical final stage electrode V8 in the second transfer unit 22.

Then, in a time period from t=8 to t=10, voltages of the transfer pulses φV7 and φV8 are switched from high to low, and a voltage of the transfer pulse φV9 is sequentially switched first to low, then to high, and then to low. Thereby, the packet held under the vertical final stage electrodes V7 and V8 is transferred to the horizontal transfer unit 4.

In the first horizontal transfer period, each packet transferred to the horizontal transfer unit 4 in the first vertical transfer period is horizontally transferred to be outputted. As a result, one third of the signal charges read out from one row (hereinafter, referred to also as "one-row signal charges") is horizontally transferred to be outputted. Two third of the one-row signal charges remaining in the second transfer unit 22 is still under the vertical final stage electrodes V7R and V7L. This situation is kept during the first horizontal transfer period. Here, in the first horizontal transfer period, the signal charges read out from the other rows in each first transfer unit 21 remain under the vertical transfer electrodes V1 and V2, without being transferred separately.

In the second vertical transfer period, at time t=0, a voltage of the transfer pulses φV1, φV2, φ7R, and φ7L are high. Here, a packet is held at a location immediately prior to the location in the first horizontal transfer period, namely, under two vertical final stage electrodes V1 and V2 in the first transfer unit 21 and under the vertical final stage electrodes V7R and V7L in the second transfer unit 22.

Then, in the second transfer unit 22, in a period from t=1 to t=6, by the transfer pulses φV7R, φV8R, and φV9, another one third of the one-row signal charges remaining under the vertical final stage electrode V7R is transferred to the horizontal transfer unit 4. Furthermore, in the first transfer unit 21, by the transfer pulses φV1 to φV4, the packet held under the vertical transfer electrodes V1 and V2 is transferred to a location under the vertical transfer electrodes V3 and V4.

In the second horizontal transfer period, each packet transferred to the horizontal transfer unit 4 in the second vertical transfer period is horizontally transferred to be outputted. As a result, another one third of the one-row signal charges is horizontally transferred to be outputted. One third of the one-row signal charges remaining in the second transfer unit 22 is still under the vertical final stage electrode V7L. This situation is kept during the second horizontal transfer period. Here, in the second horizontal transfer period, the signal charges read out from the other rows in each first transfer unit 21 remain under the vertical transfer electrodes V3 and V4, without being transferred separately.

In the third vertical transfer period, at time t=0, a voltage of the transfer pulses φV3, φV4, and φ7L are high. Here, a packet in each third column is held at a location immediately prior to the location in the second horizontal transfer period, namely, under two vertical final stage electrodes V3 and V4 in the first transfer unit 21 and under the vertical final stage electrode V7L in the second transfer unit 22.

Then, in the second transfer unit 22, in a period from t=1 to t=6, by the transfer pulses φV7L, φV8L, and φV9, last one third of the one-row signal charges remaining under the vertical final stage electrode V7L is transferred to the horizontal transfer unit 4. Furthermore, in the first transfer unit 21, by the transfer pulses φV3 to φV6, the packet held under the vertical transfer electrodes V3 and V4 is transferred to a location under the vertical transfer electrodes V5 and V6.

In the third horizontal transfer period, each packet transferred to the horizontal transfer unit 4 in the third vertical transfer period is horizontally transferred to be outputted. As a result, last one third of the one-row signal charges is horizontally transferred to be outputted. In the third horizontal transfer period, the signal charges read out from the other rows in each first transfer unit 21 are still under the vertical transfer electrodes V5 and V6.

Figure 4:
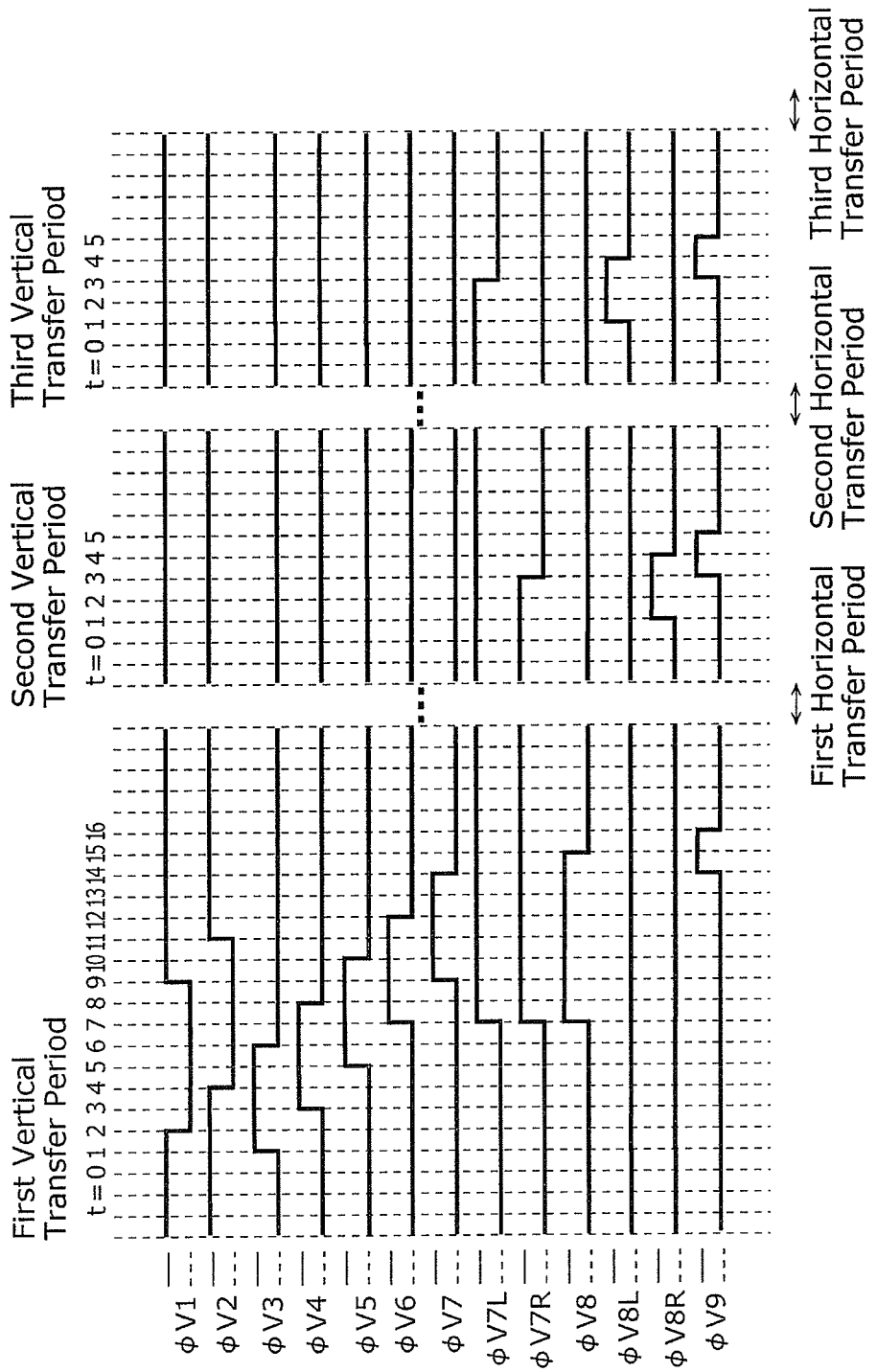
FIG. 4 is a timing diagram showing a driving method of driving a solid-state imaging device according to a prior art.

FIG. 4 is a timing diagram showing a conventional driving method of driving a solid-state imaging device having the same electrode structure as shown in FIG. 2.

In the conventional driving method, the one-row signal charges are transferred separately three times in the first to third horizontal transfer periods following the first to third vertical transfer periods, respectively. However, the conventional driving method differs form the driving method according to the present invention in that signal charges in all first transfer units 21 in the same vertical transfer group are transferred at once to respective locations under vertical transfer electrodes in a next repeating set of electrodes, in the first vertical transfer period.

More specifically, in the first vertical transfer period in FIG. 4, at time t=0, voltages of the transfer pulses φV1 and φV2 are high, so that a packet is held under two vertical transfer electrodes V1 and V2. Then, next transfer pulses cause the packet to be re-transferred to be held at a location under two vertical transfer electrodes V1 and V2 in a next repeating set of electrodes, before the first horizontal transfer period.

In the second and third vertical transfer periods, a packet remaining in the second transfer unit 22 is transferred to the horizontal transfer unit 4 in the same manner. However, the transfer pulses for the first transfer unit 21 are constant without switching their voltage levels. Therefore, a packet held in the first transfer unit 21 is not transferred separately but remains under the vertical transfer electrodes V1 and V2.

Figure 5:
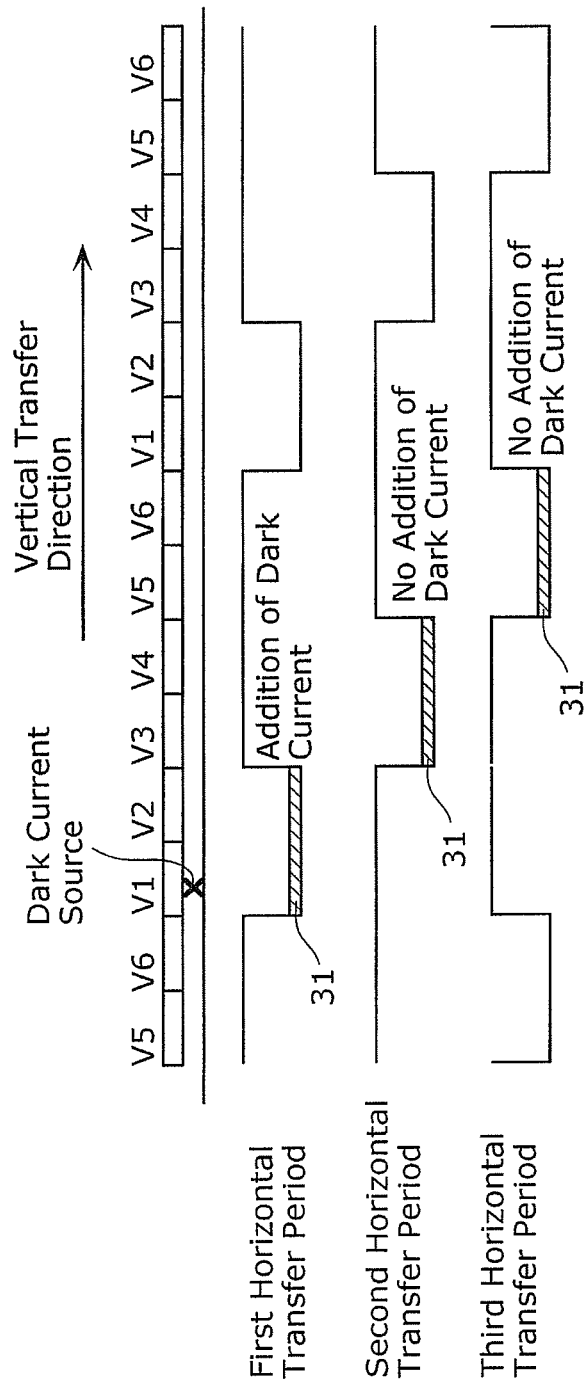
FIG. 5 is a diagram showing potential distribution in a first transfer unit in the driving method of driving the solid-state imaging device according to the first embodiment of the present invention.

FIG. 5 is a diagram showing potential distribution (potential distribution occurred under the vertical transfer electrodes V1 to V6) in the first transfer unit 21 in the driving method of driving the solid-state imaging device according to the first embodiment of the present invention As shown in FIG. 5, if under the vertical transfer electrode V1 there is a defect having a possibility of being a dark current source, dark current is accumulated in a packet 31 under the vertical transfer electrode V1 in proportion to a time period during which a charge transfer stage including the vertical transfer electrode V1 serves as a well region, namely, in proportion to a time period of an accumulating state.

In the conventional driving method shown in FIG. 4, the same charge transfer stages including the vertical transfer electrodes V1 and V2 hold the packet 31 in the accumulating state until horizontal transfer of entire one-row signal charges is completed. Here, at the same time, noise resulting from dark current from the dark current source (hereinafter, referred to also as "dark current noise") is added to the packet 31. On the other hand, by the driving method according to the first embodiment, the charge transfer stages including the vertical transfer electrode V1 are in the accumulating state only in approximately one third of an entire horizontal transfer period during which one-row signal charges are read out. Thereby, generated dark current is also reduced by approximately one third.

In addition, the structure of the electrodes in the solid-state imaging device disclosed in Patent Reference 1 fails to horizontally transfer one-row signal charges separately in different time periods. The one-row signal charges are therefore horizontally transferred at once in the same time period. Therefore, if a packet 31 is present under a vertical transfer electrode that is a dark current source in a horizontal transfer period, the packet 31 is added with dark current noise generated from the dark current source continuously during a time period of horizontal transfer of one-row signal charges. However, if there is no packet 31 under a vertical transfer electrode that is a dark current source in a horizontal transfer period, the packet 31 is hardly added with dark current noise generated from the dark current source in a time period of horizontal transfer of one-row signal charges. Therefore, the solid-state imaging device disclosed in Patent Reference 1 causes inhomogeneous vertical lines resulting from such dark current noises. On the other hand, by the driving method according to the first embodiment, dark current signals generated from one row are average signals generated in three horizontal transfer periods. Therefore, the driving method according to the first embodiment does not produce inhomogeneous vertical lines resulting from dark current noises as seen in the solid-state imaging device of Patent Reference 1, and facilitates to correct such vertical lines.

Dark current sources stochastically exist in the vertical transfer units, and some packets 31 are held under vertical transfer electrodes causing dark current. Therefore, if each set of vertical transfer electrodes holding a packet 31 is switched to another for each horizontal transfer period, the packet 31 can be held avoiding dark current sources in each horizontal transfer period. There is, of course, a possibility that a set of vertical transfer electrodes holding a packet 31 is switched to another for each horizontal transfer period but the packet 31 is thereby transferred to a location under a vertical transfer electrode having a dark current source again. However, in a total of the horizontal transfer periods, the switching of each set of vertical transfer electrodes holding a packet 31 can significantly reduce influence of dark current, in comparison with the situation without the switching. Especially, approximately one-third reduction in a maximum dark current amount is significantly advantageous.

Moreover, in the driving method according to the first embodiment of the present invention, a set of vertical transfer electrodes holding a packet 31 is different depending on each horizontal transfer period, for example, a set of vertical transfer electrodes V1 and V2, a set of the vertical transfer electrodes V3 and V4, and a set of the vertical transfer electrodes V5 and V6. Therefore, the packet 31 is not present under the same vertical transfer electrode. Therefore, a time period during which the packet 31 is added with noise from a single dark current source is reduced by one third. As a result, influence of dark current is significantly reduced.

Moreover, in the driving method according to the first embodiment, a packet in the first transfer unit 21 is transferred to a next location towards the horizontal transfer unit 4 in each of three vertical transfer periods. It is therefore possible to reduce a number of vertical transfer steps in the first vertical transfer period, by reducing the number of vertical transfer steps of signal charges read out from a next row. As a result, a total number of transfer steps in signal outputting can be reduced, and thereby a high speed of signal outputting is achieved. At the same time, noises resulting from dark current can be reduced.

Second Embodiment

Next, a solid-state imaging device and a driving method thereof according to the second embodiment of the present invention is described.

A device structure and an electrode structure of the solid-state imaging device according to the second embodiment are basically the same as those shown in FIGS. 1 and 2. The structure of the solid-state imaging device according to the second embodiment differs from that of the solid-state imaging device according to the first embodiment only in timing of drive pulses applied by the drive control unit 7 to the vertical transfer units 2 and the horizontal transfer unit 4.

Figure 6:
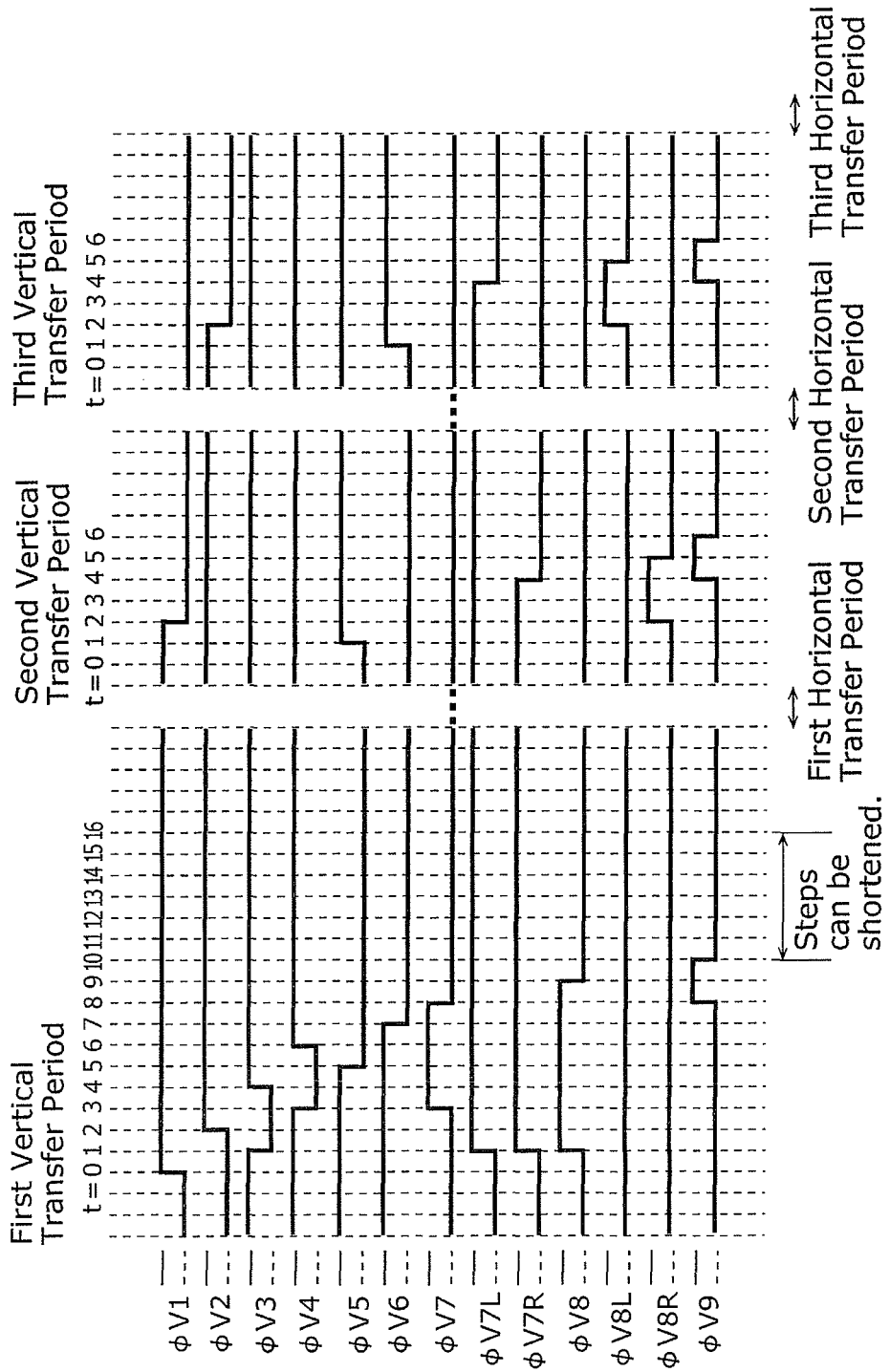
FIG. 6 is a timing diagram showing a driving method of driving a solid-state imaging device according to a second embodiment of the present invention.

FIG. 6 is a timing diagram showing the driving method of driving the solid-state imaging device according to the second embodiment of the present invention.

The driving method shown in FIG. 6 differs from the driving method according to the first embodiment in that a packet in each first transfer unit 21 is held under a set of four vertical transfer electrodes.

Figure 7A:
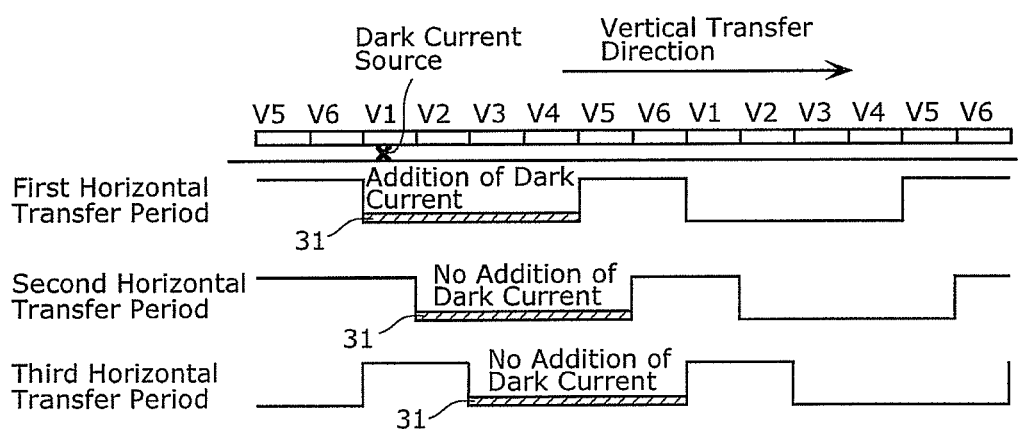
FIG. 7A is a diagram showing potential distribution in a vertical transfer unit in the driving method of driving the solid-state imaging device according to the second embodiment of the present invention.
Figure 7B:
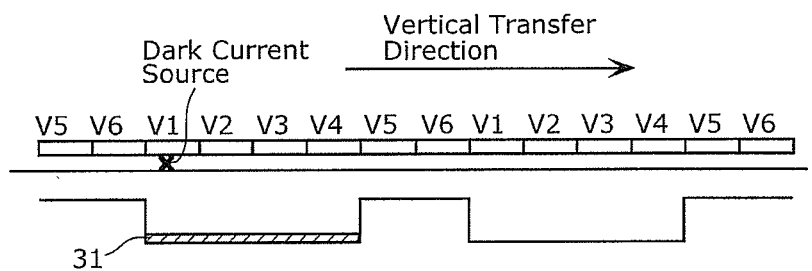
FIG. 7B is a diagram showing potential distribution in a vertical transfer unit in the driving method of driving a solid-state imaging device according to a prior art.

FIG. 7A is a diagram showing potential distribution in a vertical transfer unit 21 in the driving method of driving the solid-state imaging device according to the second embodiment of the present invention. FIG. 7B is a diagram showing potential distribution in a vertical transfer unit in a conventional driving method of driving a solid-state imaging device.

As shown in FIG. 7A, in the solid-state imaging device according to the second embodiment, a packet is held under the four vertical transfer electrodes V1 to V4 in the first horizontal transfer period, under the four vertical transfer electrodes V2 to V5 in the second horizontal transfer period, and under the four vertical transfer electrodes V3 to V6 in the third horizontal transfer period. Here, the solid-state imaging device is driven to switch a part of the vertical transfer electrodes holding the packet 31 to another for each horizontal transfer period (in other words, a combination of four vertical transfer electrodes holding a packet 31 among the repeating sets of electrodes is changed for each horizontal transfer period) On the other hand, as shown in FIG. 7B, in the conventional driving method of driving a solid-state imaging device, although a packet 31 is present under a set of four vertical transfer electrodes in a horizontal transfer period, a combination of four vertical transfer electrodes among the repeating sets of electrodes is not changed but remains the same in each horizontal transfer period.

Therefore, in the driving method of driving the solid-state imaging device according to the second embodiment, in the same manner as described for the driving method of driving the solid-state imaging device according to the first embodiment, a total time period during which a packet 31 is added with dark current noise generated by a dark current source in the vertical transfer electrode V1 in a total of the first to third horizontal transfer periods is one third of the total of the first to third horizontal transfer periods. Therefore, a dark current amount caused by the driving method according to the second embodiment is one third of that caused by the conventional driving method shown in FIG. 7B. As a result, the driving method according to the second embodiment can reduce dark current significantly.

Furthermore, in the driving method of driving the solid-state imaging device according to the second embodiment, the number of vertical transfer electrodes holding a packet is as twice as that according to the first embodiment. Therefore, a maximum possible amount of a packet is double, which increases a signal charge amount that can be transferred as one packet. As a result, a packet can be transferred without image troubles such as transfer leakage even in the situation where a captured image is a bright scene.

Third Embodiment

Next, a camera according to the third embodiment of the present invention is described.

Figure 8:
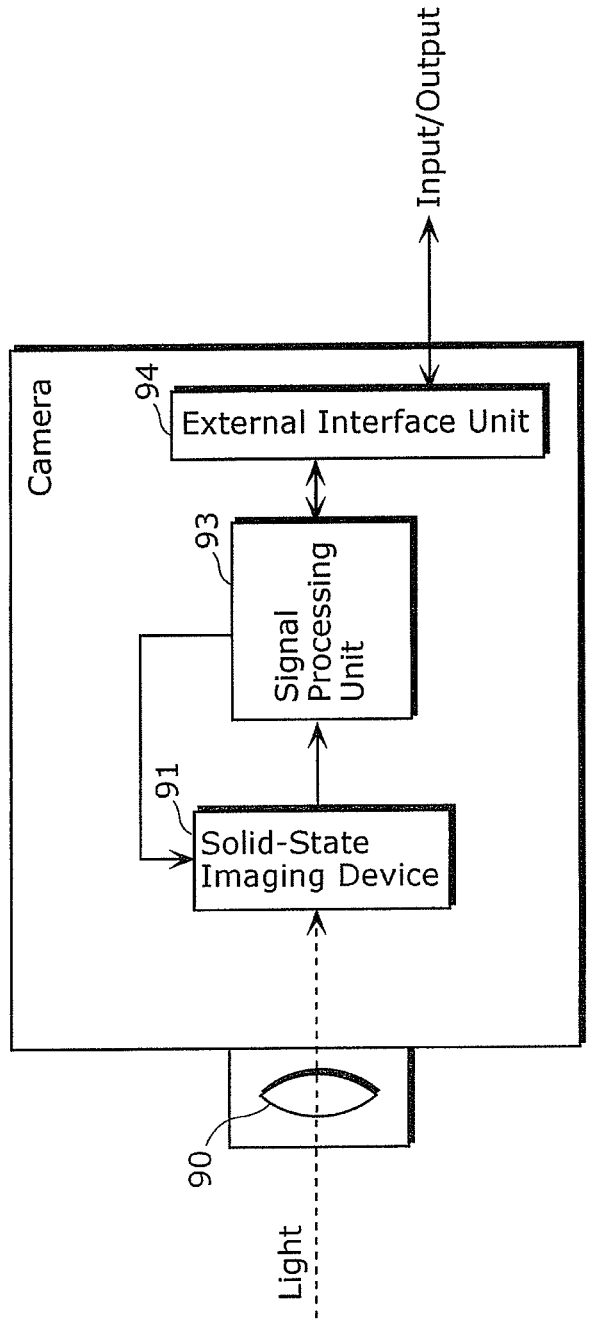
FIG. 8 is a block diagram of a camera according to a third embodiment of the present invention.
Figure 9:
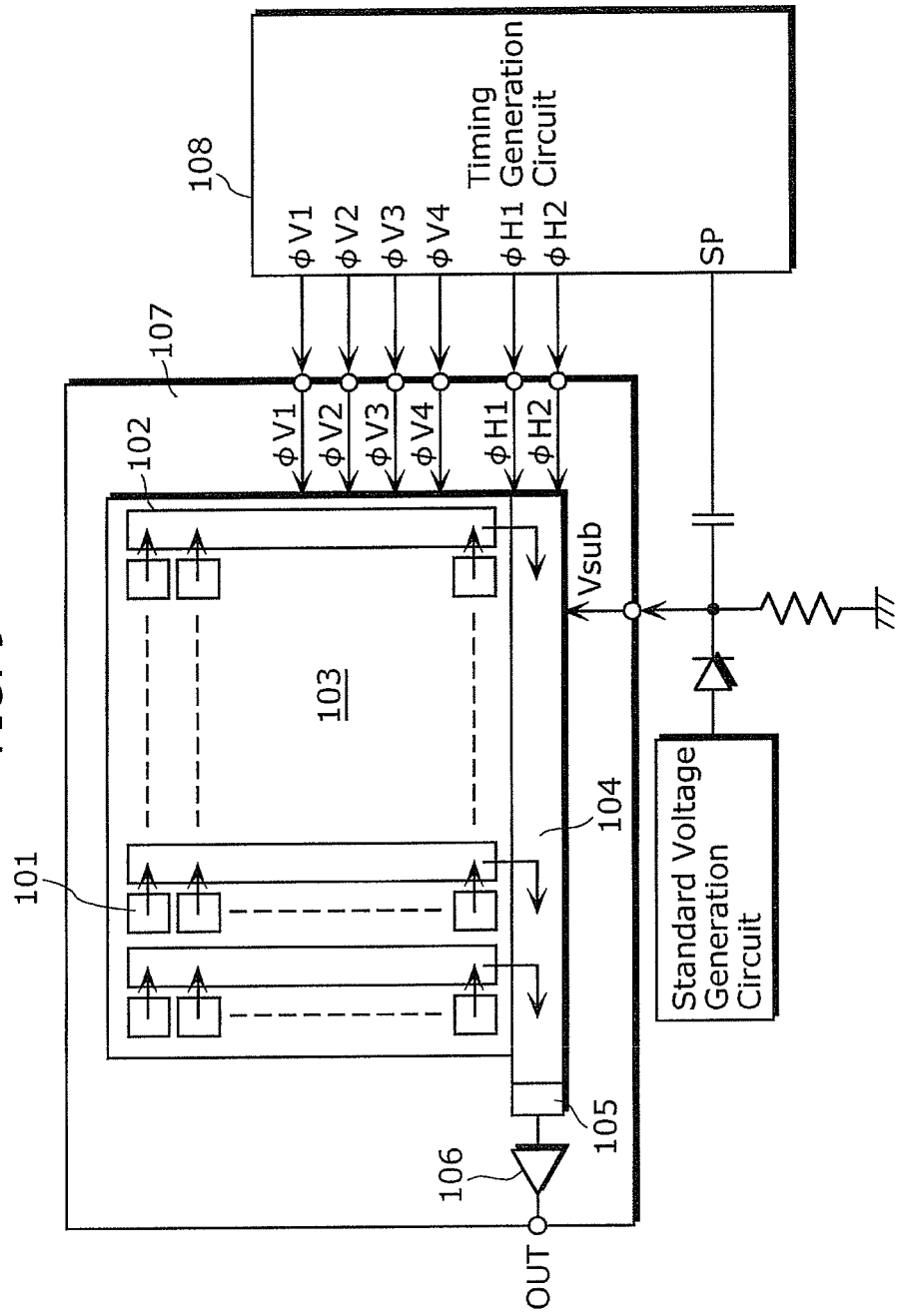
FIG. 9 is a schematic diagram showing a planar structure of a CCD solid-state imaging device.
Figure 10:
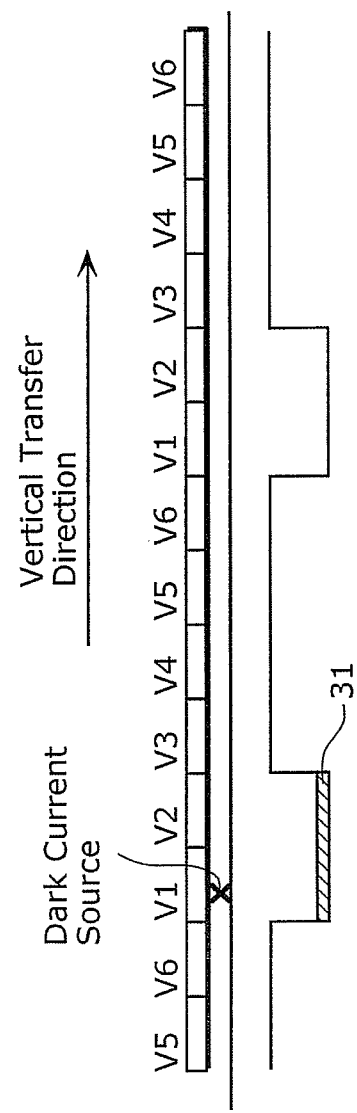
FIG. 10 is a diagram showing potential distribution in a vertical transfer unit in a driving method of driving the solid-state imaging device of FIG. 9.
Figure 11:
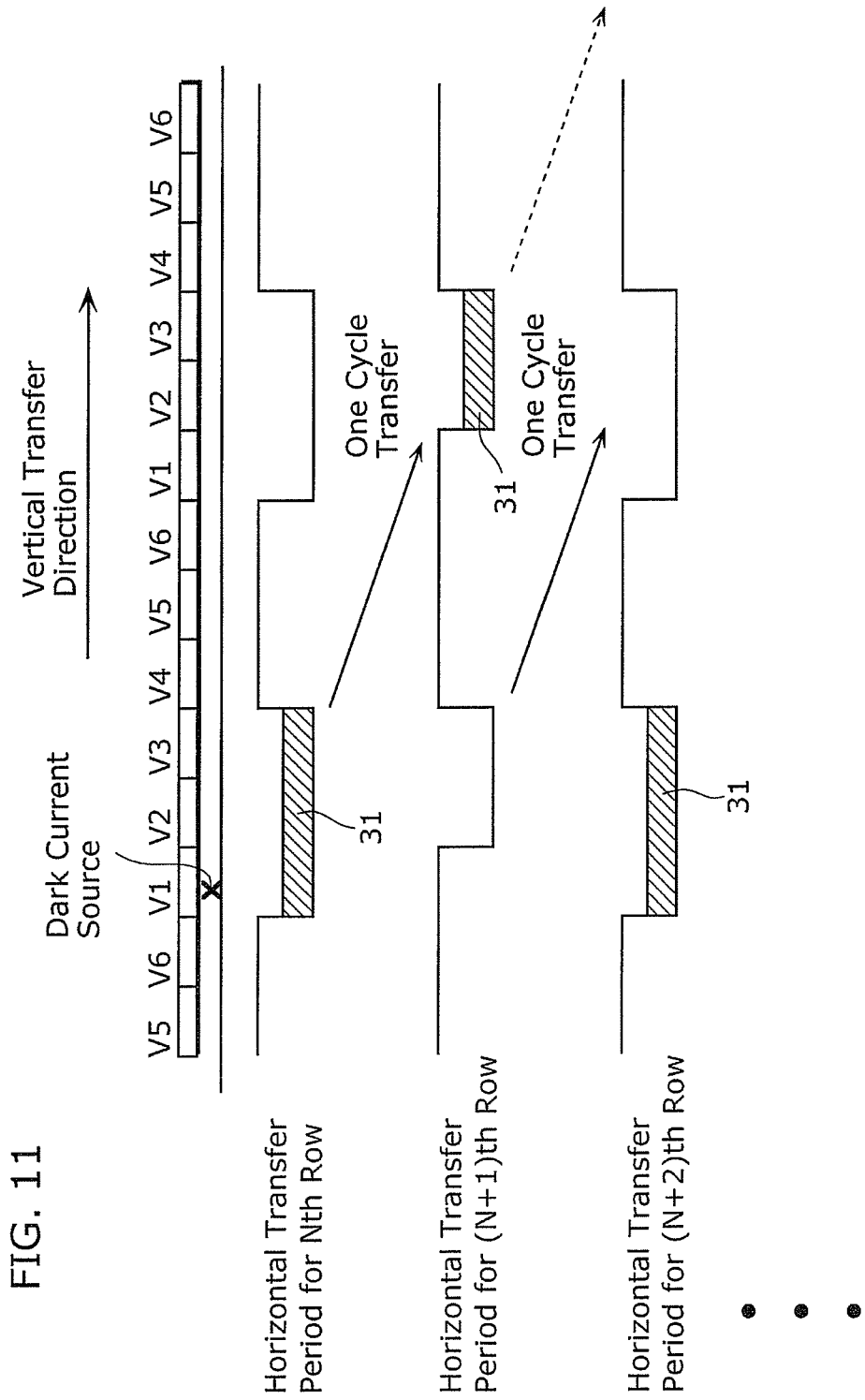
FIG. 11 is a diagram showing potential distribution in a vertical transfer unit in a driving method of driving the solid-state imaging device disclosed in Patent Reference 1.

FIG. 8 is a block diagram of a camera according to the third embodiment of the present invention.

The camera includes a lens 90, a solid-state imaging device 91, a signal processing unit 93, and an external interface unit 94. Here, the solid-state imaging device 91 is the solid-state imaging device according to the first and/or second embodiment.

The camera having the above structure performs its processing by the following steps until signals are outputted to the outside of the camera.

(1) Light passes through the lens 90 and enters the solid-state imaging device 91.

(2) The signal processing unit 93 drives the solid-state imaging device 91 and thereby retrieves output signals of the solid-state imaging device 91.

Here, based on at least one of (a) instructions from the outside and (b) an output of the solid-state imaging device 91, the signal processing unit 93 selects a charge transfer stage which serves as a well region forming a packet for each first transfer unit 21 in each of the first to third horizontal transfer periods, and thereby controls the drive control unit 7. For example, when a user designates a high gain state with a high ISO photographic sensitivity (in other words, when a dark object is imaged), the signal processing unit 93 controls the drive control unit 7 to drive the first transfer units 21 by the driving method according to the first embodiment. On the other hand, when the user designates a low gain state with a low ISO photographic sensitivity (in other words, a bright object is imaged), the signal processing unit 93 controls the drive control unit 7 to drive the first transfer units 21 by the driving method according to the second embodiment.

(3) The signals processed by the signal processing unit 93 are outputted to the outside of the camera through the external interface unit 94.

As described above, in the camera according to the third embodiment, the solid-state imaging device which reduces influence of dark current noises generates data as an output. Therefore, the camera according to the third embodiment can be implemented as a camera having high image quality.

Moreover, in the camera according to the third embodiment, the signal processing unit 93 controls transfer pulses of the drive control unit 7 based on an imaged scene, a signal charge amount, or gain setting of the camera. Thereby, it is possible to achieve both of the increase of a charge transfer possible amount and the decrease of dark current.

Although the first, second, and third embodiments of the present invention have been described for the solid-state imaging device, the driving method of driving the solid-state imaging device, and the camera including the solid-state imaging device, those skilled in the art will be readily appreciate that many modifications are possible in the exemplary embodiments without materially departing from the novel teachings and advantages of the present invention. Accordingly, all such modifications are intended to be included within the scope of the present invention.

It should be, for example, noted that, in the above-described embodiments, the drive control unit 7 can perform adjustment of a signal charge amount, such as a substrate voltage, of each of the photodiodes 1 as well as the control of transfer pulses at the same time. In this aspect, image quality can be significantly increased.

It should also be noted that in the above-described embodiments, a set of two or four vertical transfer electrodes holds one packet in a horizontal transfer period, but the number of the vertical transfer electrodes is not limited to the above.

It should also be noted that, in the above embodiments, the drive control unit 7 may control charge transfer of the vertical transfer units 2 so that, in each first transfer unit 21, the number of charge transfer stages in a set serving as one well region forming a packet is different for each of the first, second, and third horizontal transfer periods. In other words, the number of vertical transfer electrodes holding a packet may be changed for each horizontal transfer period. For example, the drive control unit 7 may control each first transfer unit 21 to hold a packet under the vertical transfer electrodes V1 and V2 in the first horizontal transfer period, and to hold the packet under the vertical transfer electrode V2 in the second horizontal transfer period. In this aspect, if (a) a sum of multiplication of the holding periods and (b) the number of the vertical transfer electrodes holding a packet in a total transfer of one-row signal charges are the same between the above embodiments and this case, it is possible to produce the same effects as those of the solid-state imaging device in the above embodiments.

It should also be noted that it has been described in the above embodiments that all of the vertical transfer units 2 are allocated into a plurality of groups (vertical transfer group) each having three vertical transfer units 2. However, the vertical transfer group may have not exactly three vertical transfer units 2 but any-numbered vertical transfer units 2.

It should also be noted that it has been described in the above embodiments that the drive control unit 7 controls each vertical transfer unit 2 so that the second transfer unit 22 in each of the plurality of vertical transfer units 2 in the same group transfers a packet to the horizontal transfer unit 4 at a timing different from a timing at which another second transfer unit in the same group transfers a different packet to the horizontal transfer unit 4. However, as far as at least two vertical transfer units 2 in the same group transfer their packets at different timings to the horizontal transfer unit 4, signal charges read out from the same row (one-row signal charges) can be horizontally transferred separately in a plurality of different periods. Therefore, not all vertical transfer units 2 in the same group need to transfer their packets at respective different timings to the horizontal transfer unit 4.

It should also be noted that it has been described in the above embodiments that each first transfer unit 21 includes six charge transfer stages to which different transfer pulses are applied. However, each first transfer unit 21 may include any transfer unit that can perform the packet transfer described in the above-described embodiments. In other words, any transfer unit is possible if it includes four or more charge transfer stages. For example, the first transfer unit 21 may include four charge transfer stages to which different transfer pulses are applied.

It should also be noted that it has been described in the above embodiments that a packet held in the first transfer unit 21 is transferred to a next location towards the horizontal transfer unit 4 in each of three vertical transfer periods. However, the three portions of the packet may be transferred in a direction opposite to the horizontal transfer unit 4.

It should also be noted that it has been described in the above embodiments that all of the vertical transfer units 2 are allocated into a plurality of groups (vertical transfer group) each having three vertical transfer units 2. However, the present invention is not limited to the above. As far as there is one vertical transfer group (one kind of vertical transfer group), signal charges read out from different kinds of columns and the same single row can be horizontally transferred separately in respective different periods.

It should also be noted that it has been described in the above embodiments that the drive control unit 7 controls charge transfer of each vertical transfer unit 2 so that, in the first transfer unit 21, the number of charge transfer stages in a set serving as one well region forming a packet is different in each of the first, second, and third horizontal transfer periods. However, if, in the first transfer unit 21, the number of the charge transfer stages in a set serving as one well region forming a packet differs between at least two of the first, second, and third horizontal transfer periods, a location of the packet in the first transfer unit 21 can be shifted in horizontal transfer periods. Therefore, the drive control unit 7 may control charge transfer of each vertical transfer unit 2 so that the number of charge transfer stages in a set serving as one well region is different in each of at least two of the first, second, and third horizontal transfer periods.

It should also be noted that it has been described in the first embodiment that the drive control unit 7 controls charge transfer of each vertical transfer unit 2 so that, in the first transfer unit 21, a set of charge transfer stages serving as a well region forming a packet (namely, all of charge transfer stages in a set serving as one well region) is different among the first, second, and third horizontal transfer periods. However, if, in the first transfer unit 21, at least one of the charge transfer stages in the set is different among the first, second, and third horizontal transfer periods, a location of the packet can be shifted in the plurality of the horizontal transfer periods. Therefore, the drive control unit 7 may control charge transfer of each vertical transfer unit 2 so that at least one of the charge transfer stages in the set is different among the first, second, and third horizontal transfer periods.

It should also be noted that it has been described in the first embodiment that the horizontal transfer unit 4 includes three charge transfer stages to which different transfer pulses are applied and that the drive control unit 7 drives the three charge transfer stages by applying them with 3-phase horizontal transfer pulses. However, the present invention is not limited to the above, as far as at least one packet is transferred for one vertical transfer group.

INDUSTRIAL APPLICABILITY

The present invention is suitable for solid-state imaging devices, driving methods of driving solid-state imaging devices, and cameras having solid-state imaging devices. Especially, the present invention is suitable for image sensors in all-in-one camcorders, digital still cameras, and medical endoscopes.

What is claimed is:

1. A solid-state imaging device comprising:
photoelectric conversion units arrayed in rows and columns;
vertical transfer units configured to read signal charges from said photoelectric conversion units and vertically transfer the signal charges;
a horizontal transfer unit configured to horizontally transfer the signal charges received from said vertical transfer units; and
a drive control unit configured to control the transfer of said vertical transfer units and the transfer of said horizontal transfer unit,
wherein said vertical transfer units are allocated to at least one group including a plurality of vertical transfer units in said vertical transfer units, the at least one group is arranged in a horizontal direction,
each of said plurality of vertical transfer units in a same group in the at least one group includes a first transfer unit and a second transfer unit, said first transfer unit receiving a driving voltage shared in the same group to vertically transfer signal charges, and said second transfer unit being provided for said first transfer unit to receive a driving voltage independent in the same group to transfer the signal charges from said first transfer unit to said horizontal transfer unit,
said first transfer unit includes four or more charge transfer stages each of which is provided for a corresponding transfer electrode and serves as a barrier region or a well region depending on a driving voltage applied to the corresponding transfer electrode, the well region being separated from another well region by the barrier region and forming a packet that is signal charges to be transferred by the well region, and
said drive control unit is configured to control the transfer of said vertical transfer units so that
(i) after said first transfer unit in each of said plurality of vertical transfer units in the same group transfers a packet, said first transfer unit stops transfer of another packet in a time period during which the packet is horizontally transferred,
(ii) said second transfer unit in each of said plurality of vertical transfer units in the same group transfers the packet to said horizontal transfer unit at a different timing different from a timing at which another second transfer unit in the same group transfers a different packet to said horizontal transfer unit,
(iii) said horizontal transfer unit horizontally transfers the packet received at the different timing, in a horizontal transfer period different from another horizontal transfer period during which the different packet is horizontally transferred, and
(iv) at least one charge transfer stage serving as the well region among said four or more charge transfer stages differs between the horizontal transfer period and the another horizontal transfer period.

2. The solid-state imaging device according to claim 1, wherein said drive control unit is configured to control the transfer of said vertical transfer units so that said first transfer unit transfers the packet in said first transfer unit towards said second transfer unit in an interval between the horizontal transfer period and the another horizontal transfer period.

3. The solid-state imaging device according to claim 2, wherein said drive control unit is configured to control the transfer of said vertical transfer units so that the number of charge transfer stages in a set serving as the well region among said four or more charge transfer stages differs between the horizontal transfer period and the another horizontal transfer period.

4. The solid-state imaging device according to claim 2,
wherein said drive control unit is configured to control the transfer of said vertical transfer units so that all of charge transfer stages in a set serving as the well region among said four or more charge transfer stages differ between the horizontal transfer period and the another horizontal transfer period.

5. The solid-state imaging device according to claim 4,
wherein said drive control unit is configured to control the transfer of said vertical transfer units so that second transfer units including said second transfer unit transfer respective packets which are included in the same group in all of said plurality of vertical transfer units to said horizontal transfer unit at respective different timings.

6. The solid-state imaging device according to claim 1,
wherein said drive control unit is configured to control the transfer of said vertical transfer units so that the number of charge transfer stages in a set serving as the well region among said four or more charge transfer stages differs between the horizontal transfer period and the another horizontal transfer period.

7. The solid-state imaging device according to claim 1,
wherein said drive control unit is configured to control the transfer of said vertical transfer units so that all of charge transfer stages in a set serving as the well region among said four or more charge transfer stages differ between the horizontal transfer period and the another horizontal transfer period.

8. The solid-state imaging device according to claim 1,
wherein said drive control unit is configured to control the transfer of said vertical transfer units so that second transfer units including said second transfer unit transfer respective packets which are included in the same group in all of said plurality of vertical transfer units to said horizontal transfer unit at respective different timings.

9. A driving method of driving a solid-state imaging device including: photoelectric conversion units arrayed in rows and columns; vertical transfer units configured to read signal charges from the photoelectric conversion units and vertically transfer the signal charges; and a horizontal transfer unit configured to horizontally transfer the signal charges received from the vertical transfer units,
wherein the vertical transfer units are allocated to at least one group including a plurality of vertical transfer units in the vertical transfer units, the at least one group is arranged in a horizontal direction,
each of the plurality of vertical transfer units in a same group in the at least one group includes a first transfer unit and a second transfer unit, the first transfer unit receiving a driving voltage shared in the same group to vertically transfer signal charges, and the second transfer unit being provided for the first transfer unit to receive a driving voltage independent in the same group to transfer the signal charges from the first transfer unit to the horizontal transfer unit, and
the first transfer unit includes four or more charge transfer stages each of which is provided for a corresponding transfer electrode and serves as a barrier region or a well region depending on a driving voltage applied to the corresponding transfer electrode, the well region being separated from another well region by the barrier region and forming a packet that is signal charges to be transferred by the well region,
said driving method comprising controlling the transfer of the vertical transfer units so that
(i) after the first transfer unit in each of the plurality of vertical transfer units in the same group transfers a packet, the first transfer unit stops transfer of another packet in a time period during which the packet is horizontally transferred,
(ii) the second transfer unit in each of the plurality of vertical transfer units in the same group transfers the packet to the horizontal transfer unit at a different timing different from a timing at which another second transfer unit in the same group transfers a different packet to the horizontal transfer unit,
(iii) the horizontal transfer unit horizontally transfers the packet received at the different timing, in a horizontal transfer period different from another horizontal transfer period during which the different packet is horizontally transferred, and
(iv) at least one charge transfer stage serving as the well region among the four or more charge transfer stages differs between the horizontal transfer period and the another horizontal transfer period.

10. A camera comprising
the solid-state imaging device according to claim 1.

11. The camera according to claim 10, further comprising
a signal processing unit configured to select a charge transfer stage serving as the well region from said four or more charge transfer stages, for each of the horizontal transfer period and the another horizontal transfer period, based on at least one of instruction from outside and an output of the solid-state imaging device.

* * * * *